(12) United States Patent
Keller et al.

(10) Patent No.: US 8,096,448 B2
(45) Date of Patent: Jan. 17, 2012

(54) OVAL CROSS-SECTION TUBE, METHOD FOR THE PRODUCTION AND DEVICE FOR THE USE THEREOF

(75) Inventors: Gerhard Keller, Vouvry (CH);
Hugues-Vincent Roy, Vouvry (CH);
Jacques Thomasset, Vouvry (CH)

(73) Assignee: Aisapack Holding S.A., Vouvry (CH)

( * ) Notice: Subject to any disclaimer, the term of this patent is extended or adjusted under 35 U.S.C. 154(b) by 1132 days.

(21) Appl. No.: 11/794,674

(22) PCT Filed: Dec. 27, 2005

(86) PCT No.: PCT/IB2005/054405
§ 371 (c)(1),
(2), (4) Date: Aug. 24, 2007

(87) PCT Pub. No.: WO2006/072865
PCT Pub. Date: Jul. 13, 2006

(65) Prior Publication Data
US 2008/0142153 A1    Jun. 19, 2008

(30) Foreign Application Priority Data

Jan. 6, 2005 (EP) .................................. 05100053

(51) Int. Cl.
*B65D 35/00* (2006.01)
*B65D 85/14* (2006.01)
*B65D 30/00* (2006.01)
*B65D 6/00* (2006.01)
*B31B 1/00* (2006.01)

(52) U.S. Cl. .......... 222/107; 222/92; 222/102; 222/215; 206/277; 383/107; 220/613; 220/666; 220/678; 493/153; 493/267

(58) Field of Classification Search .................. 222/107, 222/92, 95, 105, 102, 214, 215, 1, 93, 94; 206/277; 220/DIG. 13, 610, 612, 613, 666, 220/677, 678, 679, 680; 156/203, 217, 293, 156/294, 465, 466; 493/51, 84, 87, 152, 493/153, 267; 53/110, 133.2, 133.1; 428/34.1–36.92
See application file for complete search history.

(56) References Cited

U.S. PATENT DOCUMENTS 1,481,339 A * 1/1924 Barron .......................... 222/107
(Continued)

FOREIGN PATENT DOCUMENTS

CA          730 513          3/1966
(Continued)

OTHER PUBLICATIONS

Apr. 15, 2010 EPO Opposition by Unilever PLC.
(Continued)

*Primary Examiner* — Kevin P Shaver
*Assistant Examiner* — Stephanie E Williams
(74) *Attorney, Agent, or Firm* — Nixon & Vanderhye P.C.

(57) ABSTRACT

An elastic substantially tubular package for a semi-liquid or pasty extractable by a finger pressure product comprises a skirt, a head and optionally a cap. The skirt is formed from a wound foil and is provided with a longitudinal weld seam formed by the overlapping of the edges thereof, and the head is fixed to the circumference of the skirt end and forms an oval cross-section at the level of the skirt fixing area. The end of the longitudinal weld seam contacting the head is located in or near an area where the radius of curvature of the oval cross-section is minimal.

17 Claims, 4 Drawing Sheets

U.S. PATENT DOCUMENTS

Figure 1:
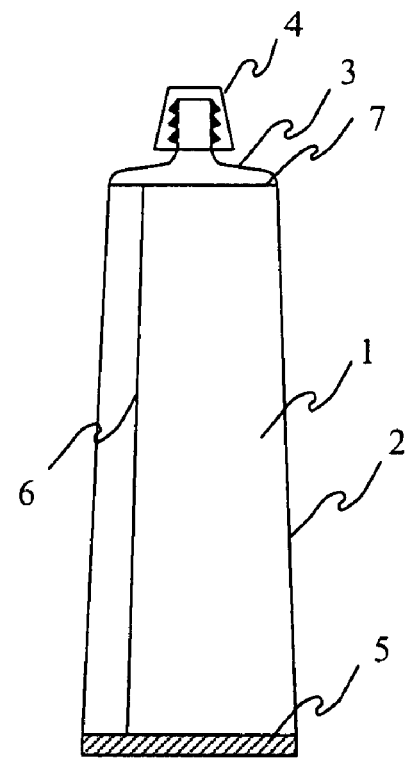

| | | | | | |
|---|---|---|---|---|---|
| 2,274,173 | A | * | 2/1942 | Temple | 222/92 |
| 2,377,532 | A | * | 6/1945 | Waters | 264/249 |
| 2,383,230 | A | * | 8/1945 | Voke | 156/69 |
| 2,718,983 | A | | 9/1955 | Deskey | |
| 2,890,482 | A | | 6/1959 | Quinche | |
| 2,913,768 | A | | 11/1959 | Lecluyse et al. | |
| 3,307,738 | A | * | 3/1967 | Scheindel | 220/678 |
| 3,353,714 | A | * | 11/1967 | Trecek | 222/107 |
| 3,769,117 | A | | 10/1973 | Bowen et al. | |
| 3,832,964 | A | * | 9/1974 | Rockefeller | 29/525 |
| 4,126,249 | A | * | 11/1978 | Wood | 222/92 |
| 4,200,482 | A | | 4/1980 | Mägerle | |
| 4,265,948 | A | * | 5/1981 | Hayes et al. | 222/92 |
| 4,512,832 | A | * | 4/1985 | Rausing | 156/86 |
| 4,986,053 | A | * | 1/1991 | Schaefer | 53/401 |
| 5,730,694 | A | * | 3/1998 | Hagleitner | 493/108 |
| 2004/0016279 | A1 | | 1/2004 | Peacock | |
| 2005/0265636 | A1 | * | 12/2005 | Michalsky | 383/104 |

FOREIGN PATENT DOCUMENTS

| | | |
|---|---|---|
| DE | 11 43 630 | 2/1963 |
| FR | 2 224 364 | 10/1974 |
| FR | 2 540 073 | 8/1984 |
| FR | 2 702 738 | 9/1994 |
| FR | 2 856 981 | 1/2005 |
| GB | 773 172 | 4/1957 |
| JP | 53-46380 | 4/1978 |
| JP | 59-118749 | 8/1984 |

OTHER PUBLICATIONS

Cap feed module (manufactured 2004) of oval tube manufacturing machine, Sep. 8, 2004.
Shoulder feed module (manufactured 2004) of oval tube manufacturing machine, Sep. 8, 2004.
Body orientate module (manufactured 2004) of oval tube manufacturing machine, Sep. 8, 2004.
Oval tube manufacturing machine, Sep. 8, 2004.
Detail of mechanism of oval tube manufacturing machine of D1d, Sep. 8, 2004.
Order No. 152 of Sep. 8, 2004.
Invoice No. 9930 of Oct. 8, 2004.
Customs declaration form 4301/1-19716 of Oct. 7, 2004.
Apr. 1, 2010 EPO Opposition by Mechatronica SC.
Technical chart of oval mandrel dated Sep. 17, 2003.
Order No. 152/Sep. 8, 2004.
Warehouse receipt No. 111/Oct. 6, 2004.
Invoice No. 9930/Oct. 8, 2004.
Invoice No. 9215/Oct. 7, 2004.
Customs Declaration Oct. 7, 2004.
Air waybill Oct. 8, 2004.
Order No. 158/Oct. 1, 2004.
Warehouse receipt No. 124/Nov. 29, 2004.
Invoice No. 9987/Nov. 29, 2004.
Invoice No. 9221/Nov. 29, 2004.
Customs Declaration Nov. 19, 2004.
Air waybill Dec. 1, 2004.
Pictures of the equipment with factory No. 28485/04 produced by Mechatronica SC according to order No. 2-1451, Nov. 19, 2004.
Pictures of the equipment produced by Mechatronica SC in action, Nov. 19, 2004.
Reference for the factory numbers of Mechatronica SC, Nov. 19, 2004.
Declaration from Bijay Agarwal, director of ABDOS Lamitubes Private Limited, India, dated Feb. 9, 2010; A-1. Order dated Dec. 29, 2004 from Hindustan Lever Ltd to ABDOS Lamitubes Pvt. Limited for manufacturing of oval tubes; A-2. Order dated Dec. 29, 2004 from Hindustan Lever Ltd to ABDOS Lamitubes Pvt. Limited for manufacturing of oval tubes; B-1. Invoice No. 0458/ Jan. 2, 2005 of ABDOS Lamitubes Pvt. Limited to Hindustan Lever Ltd for manufactured oval tubes according to Order dated Nov. 6, 2004. B-2. Packing list of products of Invoice No. 0458; Nov. 6, 2004 B-3. Consignment note for of products of Invoice No. 0458 and 0457; Nov. 6, 2004 C-1. Invoice No. 0463/ Jan. 4, 2005 of ABDOS Lamitubes Pvt. Limited to Hindustan Lever Ltd for manufactured oval tubes according to Order dated Nov. 6, 2004 C-2. Packing list of products of Invoice No. 0463; Nov. 6, 2004 C-3. Consignment note for of products of Invoice No. 0463 and 0464; Nov. 6, 2004 D-1 to D-8 Invoice, shipping documents for delivery to ABDOS Lamitubes Pvt. Limited and pictures of equipment for oval tubes with factory No. 28481 manufactured by Mechatronica S.C. on Nov. 15, 2004 according to Order 2-1450.11; E-1 to E-5 Invoice, shipping documents for delivery to ABDOS Lamitubes Pvt. Limited of Equipment for oval tubes with factory No. 28488 manufactured by Mechatronica S.C. on Dec. 9, 2004 According to Order 2-1451.11.
Declaration dated Feb. 5, 2010 from Soumitra Choudhury, General manager Factory, ABDOS Lumitubes Private Limited, India, dated Feb. 5, 2010.
Declaration dated Feb. 6, 2010 from Soumitra Choudhury, General Manager Factory, ABDOS Lamitubes Private Limited, India, dated Feb. 6, 2010.
Opposition by Hindustan Unilever Limited against Indian Patent Application of Aisapack Holding SA No. 3450/CHENP/2007 (with priority Jan. 6, 2005), equivalent to EP1833730, Feb. 25, 2009.
International Search Report mailed Jun. 2, 2006 (English and French Translations).
English Translation of Written Opinion of the International Searching Authority, Jun. 2, 2005.

* cited by examiner

OVAL CROSS-SECTION TUBE, METHOD FOR THE PRODUCTION AND DEVICE FOR THE USE THEREOF

This application is the U.S. national phase of International Application No. PCT/IB2005/054405 filed 27 Dec. 2005 which designated the U.S. and claims priority to EP 05100053.7 filed 6 Jan. 2005, the entire contents of each of which are hereby incorporated by reference.

FIELD OF THE INVENTION

The present invention falls in the field of packagings of tubular shape intended to contain, for example, toothpaste or cosmetic or food products.

More specifically, the present invention relates to tubes of oval cross section which are obtained from a rolled film that is rolled up and welded.

PRIOR ART

Several methods for manufacturing flexible tubes known as "rolled tubes" are known. By way of example, mention may be made of the Schmid & Jeker American U.S. Pat. No. 4,123,312.

In general, a rolled tube produced by assembling prefabricated components comprises the following elements: a skirt, a head and a cap.

The head is more or less in the shape of a hollow cone frustum on which there is located a cylinder that forms the narrow neck and the external face of which may be threaded in order to accept a cap screwed onto it. Alternatively, the external face of the narrow neck is not threaded, the cap being simply push-fitted onto it. In general, the head and the cap are plastic components produced by injection molding or compression molding.

Once formed, the skirt has an essentially tubular shape. It is produced from rolls of single-layer or multi-layer rolled stock, with or without a sheet of aluminum and which may be printed or blank.

One common method for manufacturing rolled tubes involves the following steps:
   Starting from a roll of rolled film, rolled stock is rolled up around a mandrel of circular cross section and welded to form an endless cylindrical tube. The cylinder is then cut into skirts of determined length.
   The heads and caps are automatically loaded into the device.
   The heads are attached to the skirts by welding.
   The caps are attached onto the heads.
There are also methods in which one or more elements are produced at the time of assembly.

Producing rolled tubes by assembling prefabricated components offers the advantage that the components can be sorted and those which do not meet the quality criteria eliminated prior to the assembly steps. Thus, this method of producing rolled tubes makes it possible to obtain tubes of better quality at a higher output rate.

Most heads of rolled tubes in the prior art are characterized by having a circular cross section.

The rolled tubes of the prior art do, however, have a number of disadvantages. For example, when they are placed in a sales outlet, the area of the skirt rendered visible to the consumer, that is to say the area presented directly to that consumer without the consumer having to turn the tube over, is relatively small.

The following patent documents describe tubes of non-circular cross section:
FR-A-2856981, FR-A-2224364, US-A-2004/0016279, DE-B-1143630 and FR-A-2702738.

These priority documents do, however, relate to tubes in which the skirt has a longitudinal weld positioned along the main face of the tube, namely along the face which corresponds to the region in which the oval cross section has its maximum radius of curvature. See, in particular, FR-A-2856981 and FR-A-2702738.

In these instances, use of one of the main surfaces of the tube for commercial purposes (for providing the consumer with information) is therefore impeded by the presence of the longitudinal weld.

There is therefore a need to remedy the aforementioned problem by offering tube main surfaces that are entirely free of weld.

SUMMARY OF THE INVENTION

The present invention has the merit in particular of remedying the aforementioned disadvantage.

To this end, the invention relates to a flexible packaging of essentially tubular shape and intended to contain a semi-liquid or pasty product that can be expelled under the pressure of fingers, said packaging comprising a skirt, a head and, optionally, a cap; the skirt being formed of a rolled-up sheet and comprises a longitudinal weld formed by the overlapping of its edges; the head being fixed to the periphery of one of the ends of the skirt and forms an oval cross section at the region where it is attached to the skirt; said packaging being characterized in that the end of the longitudinal weld that is in contact with the head lies at or near the point where the radius of curvature of said oval cross section is at its minimum.

The present invention also relates to a method and a device for producing the aforementioned packaging.

DETAILED DESCRIPTION OF THE INVENTION

The invention will be better understood hereinbelow by means of an example of a rolled tube that has a head of oval cross section, that is to say a shape in the form of a closed curve with two unequal diameters. The example below is illustrated by the following figures:

FIG. 1 depiction of a tube according to the invention.

Figure 2:
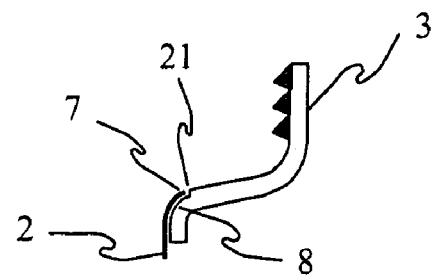

FIG. 2 detailed drawing of the region of the weld between the skirt and the head of the tube.

Figure 3A:
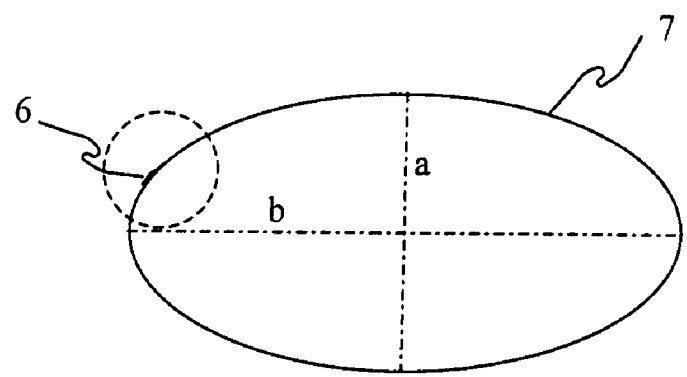

FIG. 3a a view on a plane perpendicular to the axis of the skirt, showing the region of the weld between the skirt and the head of the tube.

Figure 3B:
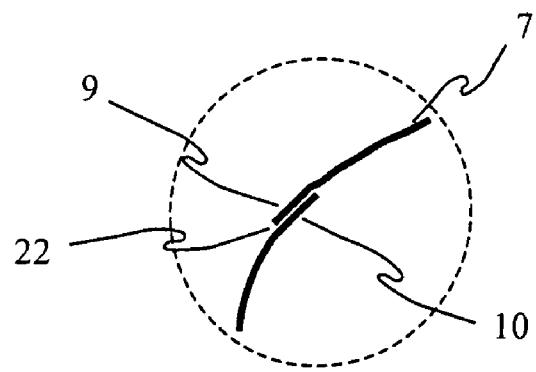

FIG. 3b a detailed drawing of the region of overlap of the rolled stock of which the tube is made.

Figure 4:
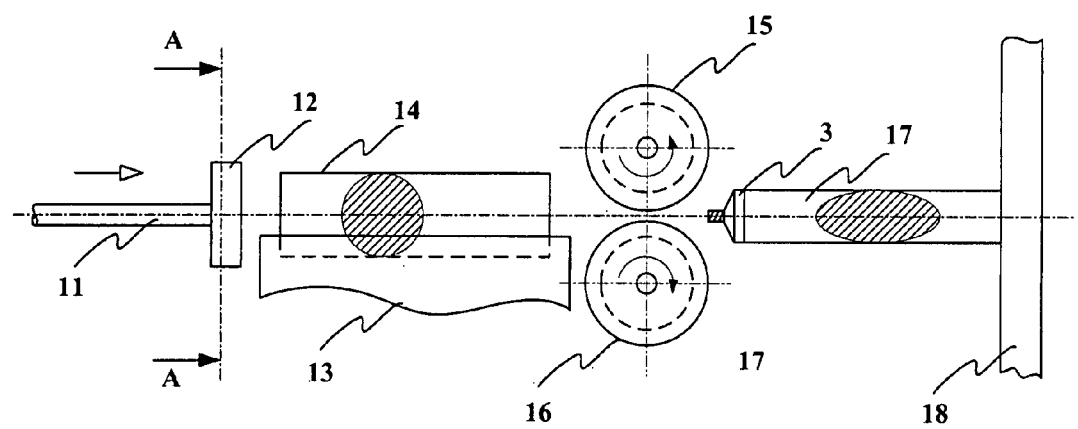

FIG. 4 a $1^{st}$ device according to the invention for forming the skirt and transferring it onto an oval mandrel.

Figure 5:
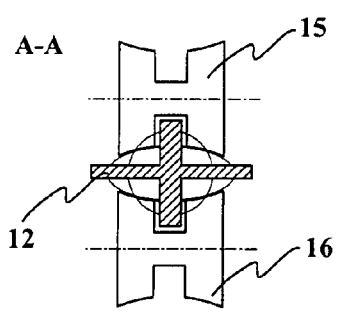

FIG. 5 section on AA of the $1^{st}$ device according to the invention shown in FIG. 4.

Figure 6:
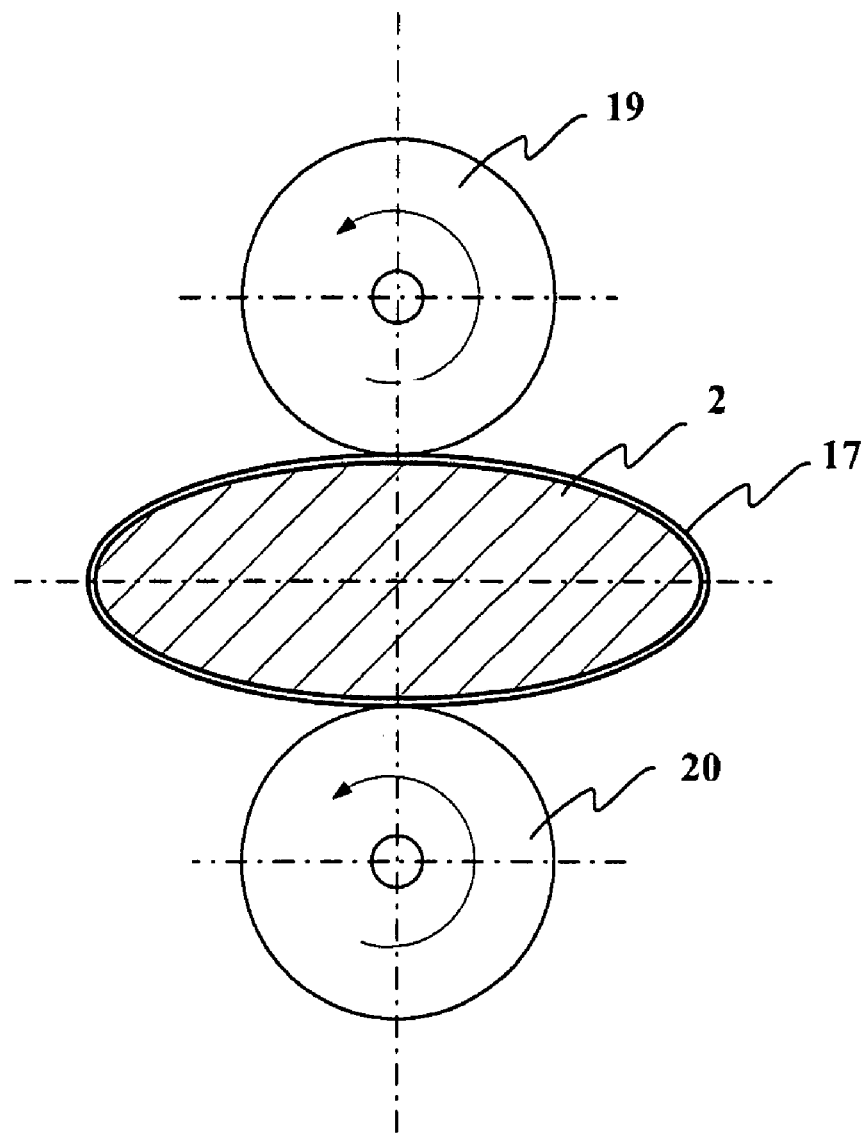

FIG. 6 a $2^{nd}$ device according to the invention for orientating the skirt on an oval mandrel.

The rolled tube 1 illustrated in FIG. 1 is made up of a skirt 2, a head 3 and a cap 4; a flat closure 5 being formed towards the opposite end of the tube 1 to the end at which the cap 4 is situated. The skirt 2 comprises a longitudinal weld 6 along its entire length. The skirt 2 is welded to the head 3 around its entire top end 7.

FIG. 2 shows in detail the region of the weld between the skirt 2 and the head 3 of the tube. The skirt 2 overlaps the head 3 in a region 8 that has a radius of curvature R. This region is delimited at its top by a step 21 for positioning the skirt 2. For esthetic reasons, it is preferable to ensure that the top end 7 of the skirt lies in a plane perpendicular to the axis of the cylindrical skirt. This can be achieved by ensuring that the radius of curvature of this overlap region 8 has a constant value around the entire periphery of the head of the tube and by ensuring that the step 21 is indeed in a plane perpendicular to the axis of the skirt 2.

FIG. 3*a* shows a view of the end of the skirt 7 in a plane perpendicular to the axis of the skirt. In FIG. 3*a*, the head of the packaging according to the invention has an oval cross section characterized by a semi-minor axis a and a semi-major axis b. The longitudinal weld of the skirt 6 is detailed in FIG. 3*b*. This weld is made up of a region of overlap comprising the welded part of the top section of rolled stock 9 and the welded part of the bottom section of rolled stock 10. The end of the top section of rolled stock 9 delimits the visible region 22 of the longitudinal weld.

FIG. 4 shows an example of part of a device for forming oval rolled tubes according to the invention. This part relates to the particularly critical bit of the forming of the oval skirt 2 from a circular skirt 14, and the transfer of this oval skirt 2 onto an oval mandrel 17. The device consists of a skirt pusher 11 with a pusher head 12 in the shape of a cross with arms of unequal length, of a concave support 13 equipped with appropriate means for holding the skirt in position (such as a vacuum system), of forming rolls 15, 16 rotating about an axis perpendicular to the sheet and a mandrel 17 positioned on a mandrel support 18.

FIG. 5 shows a section on A-A of the pusher head 12. This pusher head 12 is in the shape of a cross the arms of which are of unequal lengths so that they can pass between the two forming rolls 15, 16. The arms of this pusher head 12 have a length slightly longer than the half-axes of the cross section of the head so as to ensure contact between these arms and the edge of the skirt after forming.

FIG. 6 shows another example of part of a device for forming oval rolled tubes according to the invention. This part relates to the particularly critical bit of orientating the skirt 2 on the oval mandrel 17. This orientation is performed using appropriate means such as drive rolls 19, but could also be achieved using belts or shoes.

An oval rolled tube according to the present invention has the advantage of offering a large almost flat area that can bear a printed decoration making the packaging particularly attractive to the consumer. For this attractive effect to be even better it is beneficial for the longitudinal weld of the rolled stock 7 to be positioned in a region that is not particularly visible to the consumer. According to the present invention, it has proved to be particularly suitable for this longitudinal weld to be positioned in a region close to the minimum radius of curvature of the head of the tube and, more specifically, at a distance less than $\sqrt{2}.a/2$ from the major axis of the oval cross section of the skirt, where a is the semi-minor axis of the oval cross section of the skirt. For the same visual reasons, according to the present invention, it is also particularly recommended for the overlap between the upper section of rolled stock 9 and the lower section of rolled stock 10 to be positioned, in the region of the longitudinal weld 6, in such a way that the visible part of the weld 22 faces towards the region where the radius of curvature of the skirt is at its minimum.

The description of a method and a device for producing an oval rolled tube according to the present invention will become more clearly apparent once the various production steps have been explained:

a) Starting from the roll of rolled film, the rolled stock is rolled up and welded in such a way as to form an endless right circular cylinder. Next, this cylinder is cut into skirts of determined length.

b) The heads of oval cross section and the caps are automatically loaded into the apparatus used to make the rolled tube. The oval heads are positioned at the end of mandrels 17 of oval cross section.

c) The circular skirts are orientated at an angle with respect to their axis of symmetry so that the location of the longitudinal weld 6 can be correctly positioned.

d) The pre-orientated circular skirts are deformed into right cylinders of oval cross section and are loaded onto the mandrels 17 of oval cross section, using appropriate means.

e) On the oval mandrels, the skirts are once again orientated in such a way that they are positioned exactly with respect to the heads, using appropriate means.

f) The heads are assembled and welded to the skirts.

g) The caps are screwed or clipped onto the heads of the rolled tubes.

One method for forming an oval tube (step d of the above method) according to the invention and using the device shown in FIGS. 4 and 5 comprises the following steps:

Loading a circular skirt 14 onto a concave support 13.

Pushing the circular skirt 14 into the forming zone using a pusher 11.

Forming the skirt into an oval cylinder using the forming rolls 15, 16 while at the same time pushing it using the pusher 11. The forming rolls 15, 16 are of concave shape so as to form the skirt into the same oval shape as the head 3 of the tube.

Sliding the oval skirt onto the oval head 3 and onto the oval mandrel 17 using the pusher 11.

In order to position this longitudinal weld with respect to the head of the tube it is possible to orientate the skirt at an angle before it is loaded onto the oval mandrel if the skirt is still a cylinder of circular cross section. This orientation can be performed using means well known to those skilled in the art. However, for precise orientation it is necessary to perform a second orientation when the skirt is in position on the oval mandrel, because the transfer and forming process cannot guarantee that the orientation will be maintained precisely. This orientation on the oval mandrel is particularly critical and, according to the present invention, can be carried out advantageously if the appropriate means for moving the skirt are situated in the region where the radius of curvature of the skirt is at its maximum. This is because the friction forces of the skirt rubbing against the mandrel are lower when the radius of curvature is at its maximum.

Another method and a second device for producing an oval rolled tube according to the present invention is described using the following procedure:

h) Starting from the roll of rolled film, the rolled stock is cut into sheets of determined length.

i) These sheets are rolled up around a first mandrel of oval cross section and welded to form cylindrical skirts of oval cross section.

j) The heads of oval cross section and the caps are automatically loaded into the apparatus used to make the rolled tube. The oval heads are positioned at the end of a second mandrel 17 of oval cross section.

k) The oval skirts are transferred onto from the first mandrel towards the second mandrel 17 of oval cross section using appropriate means.

l) On the oval mandrels, the skirts are orientated in such a way as to position them exactly with respect to the heads, using appropriate means.

m) The heads are assembled and welded to the skirts.
n) The caps are screwed or clipped onto the heads of the rolled tubes.

The invention claimed is:

1. A flexible packaging of essentially tubular shape and intended to contain a semi-liquid or pasty product that can be expelled under the pressure of fingers, said packaging comprising
   a skirt having ends,
   a head, and, optionally,
   a cap,
   wherein the skirt is formed of a rolled-up sheet and comprises a longitudinal weld formed by the overlapping of edges of the sheet,
   wherein the head is fixed to the periphery of one of the ends of the skirt and forms an oval cross section at the region where the head is attached to the skirt,
   wherein an end of the longitudinal weld that is in contact with the head lies at or near a point where a radius of curvature of said oval cross section is at its minimum.

2. The packaging as claimed in claim 1, wherein the edge of said sheet forming the upper part of the longitudinal weld is directed towards the region where the radius of curvature of said skirt is at its minimum.

3. The packaging as claimed in claim 1, wherein the skirt comprises a flat closure at its opposite end to the end at which said head is situated and in that said flat weld is parallel to the direction of the major axis of said oval cross section.

4. The packaging as claimed in claim 1, wherein the region of skirt/head attachment lies in a plane perpendicular to the main axis of the skirt.

5. A method for producing a flexible packaging of essentially tubular shape and intended to contain a semi-liquid or pasty product that can be expelled under the pressure of fingers, said packaging comprising
   a skirt having ends,
   a head, and, optionally,
   a cap,
   wherein the skirt is formed of a rolled-up sheet and comprises a longitudinal weld formed by the overlapping of edges of the sheet,
   wherein the head is fixed to the periphery of one of the ends of the skirt and forms an oval cross section at the region where the head is attached to the skirt, and
   wherein an end of the longitudinal weld that is in contact with the head lies at or near a point where a radius of curvature of said oval cross section is at its minimum,
   and wherein the method comprises the following steps:
      preparing skirts around a mandrel,
      loading heads onto the end of an oval mandrel of a cross section similar to that of the heads,
      attaching the heads to the skirts,
   wherein the skirts are orientated at an angle with respect to their axis of symmetry so that the longitudinal weld can be positioned at or near the point where the radius of curvature of said oval cross section is at its minimum.

6. The method as claimed in claim 5, comprising the following successive steps:
   preparing skirts around a mandrel of circular cross section,
   loading heads onto the end of an oval mandrel of a cross section similar to that of the heads,
   deforming the skirts and transferring them onto the mandrel of oval cross section,
   attaching the heads to the skirts,
   attaching caps (if any) onto the heads.

7. The method as claimed in claim 6, wherein the skirts are orientated at an angle prior to the step of deforming and transferring them.

8. The method as claimed in claim 6, wherein the skirts are orientated at an angle while they are on the mandrel of oval cross section.

9. The method as claimed in claim 6, wherein said deformation is carried out by passing the skirts through a forming zone.

10. The method as claimed in claim 5, comprising the following successive steps:
    preparing skirts around a mandrel of oval cross section,
    loading heads and caps (if any) onto the end of a mandrel of oval cross section similar to that of the heads,
    moving the skirts towards the heads,
    attaching the heads to the skirts.

11. The method as claimed in claim 5, wherein the skirts are orientated at an angle while they are on the mandrel of oval cross section.

12. A device for manufacturing
    a flexible packaging of essentially tubular shape and intended to contain a semi-liquid or pasty product that can be expelled under the pressure of fingers, said packaging comprising
    a skirt having ends,
    a head, and, optionally,
    a cap,
    wherein the skirt is formed of a rolled-up sheet and comprises a longitudinal weld formed by the overlapping of edges of the sheet,
    wherein the head is fixed to the periphery of one of the ends of the skirt and forms an oval cross section at the region where the head is attached to the skirt, and
    wherein an end of the longitudinal weld that is in contact with the head lies at or near a point where a radius of curvature of said oval cross section is at its minimum,
    wherein the device comprises
    a skirt-forming mandrel,
    means for moving the skirts along said mandrel,
    means for loading heads,
    means for attaching the heads to the skirts,
    said means for loading the heads being designed to accept heads of oval cross section,
    wherein the device comprises means for orientating the skirts at an angle before the skirts are attached to the heads.

13. The device as claimed in claim 12, wherein the skirt-forming mandrel is of circular cross section and in that the device comprises means for deforming the skirts before the skirts are attached to the heads.

14. The device as claimed in claim 13, further comprising a mandrel of a cross section similar to that of the heads.

15. The device as claimed in claim 12, wherein said means for orientating the skirts at an angle lie in regions where the radius of curvature of the skirts is at its maximum.

16. The device as claimed in claim 12, wherein the mandrel for forming the skirts is of oval cross section.

17. The device as claimed in claim 16, wherein said means for orientating the skirts at an angle lie in regions where the radius of curvature of the skirts is at its maximum.

* * * * *